Figure 1:
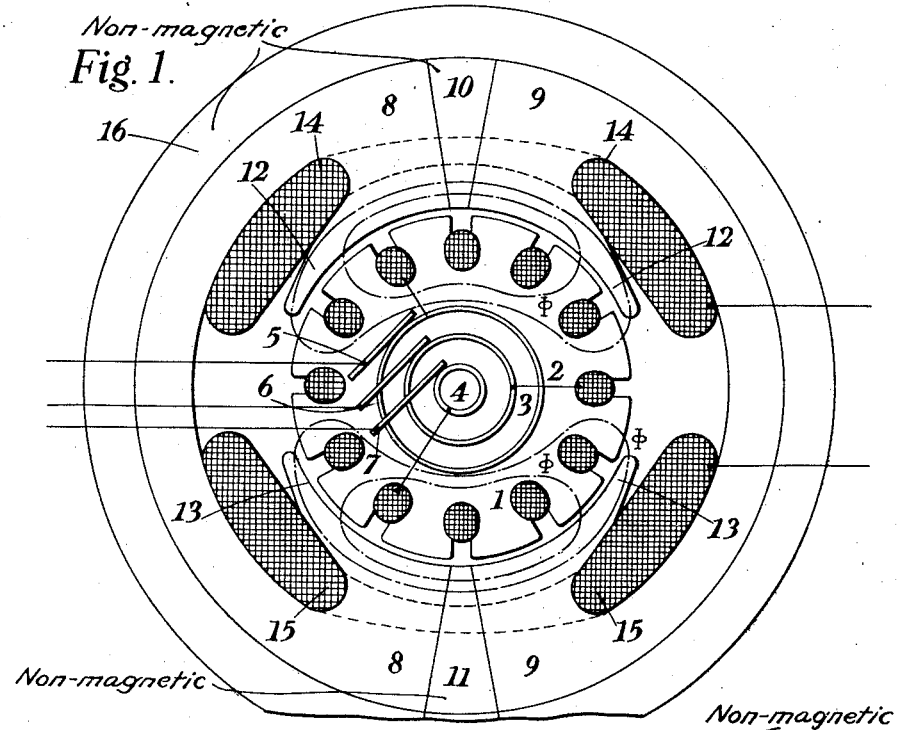

Feb. 8, 1938.  R. H. NISBET  2,107,872

DYNAMO-ELECTRIC MACHINE

Filed Jan. 3, 1935

INVENTOR
ROBERT H. NISBET
BY
Herbert H. Thompson
HIS ATTORNEY.

Patented Feb. 8, 1938

2,107,872

UNITED STATES PATENT OFFICE 2,107,872

DYNAMO-ELECTRIC MACHINE

Robert Hayes Nisbet, Osterley, England, assignor to Sperry Gyroscope Company Inc., Brooklyn, N. Y., a company of New York Application January 3, 1935, Serial No. 224
In Great Britain January 4, 1934

4 Claims. (Cl. 172—120)

This invention relates to dynamo electric machines of the kind which during normal operation are characterized by a magnetic field on a definite axis, the position of which relative either to the stator or to the rotor depends on the position of a fixed or variable winding which may be called the exciting winding. More especially it relates to salient pole machines of this type such as certain types of A. C. series motors and to a particular class of machine having the above characteristics, namely, transmitters and receivers for a remote indicating or control system in which a given motion,—usually an angular motion—of the exciting winding, or a motion of a rotor relative to the exciting winding, is reproduced at the distant receiving element. Such transmitters and receivers are usually referred to as self-synchronous transmitters and receivers.

The chief object of the present invention is to increase the torque of such dynamo electric machines.

The torque is determined by the product of the magnetic field strength of the poles of the exciting winding and the current in the conductors under the poles. These conductors form a circuit the current in which tends to produce a field electrically at right angles to the main field produced by the exciting winding. This field may be referred to as the cross field and the circuit which produces it may be referred to as the cross winding. The E. M. F. which causes current to flow in the cross winding I refer to as the cross E. M. F.

In the case of self-synchronous transmitters and repeaters, the cross E. M. F. is the E. M. F. which is brought into existence when there is misalignment between the transmitter and receiver. It is the currents due to this cross E. M. F. which are responsible for the aligning torque.

The object of the present invention is to increase the currents which the cross E. M. F. causes to flow in the above defined cross winding. This is achieved by reducing the inductance of the cross winding.

Two methods of bringing about this result are well known in the art. The first is to arrange a large air gap in the cross field, that is, to use salient poles for the exciting winding. The second is to use a short circuited winding at right angles to the main exciting winding. With either system, but more particularly with the salient pole system, there is considerable leakage flux threading the cross winding and completing its circuit across the face of the pole of the exciting winding. The linkages of this flux with the cross winding determine the inductance of the latter, so that the inductance can be lowered by cutting down this leakage flux.

The present invention consists in introducing into the poles carrying the main flux air gaps or gaps of non-magnetic material interrupting the paths of the leakage flux in such a way that they do not form gaps interrupting the path of the main flux due to the exciting winding.

A further advantage obtained by reducing the cross flux is that the distortion of the exciting flux which is produced by the cross flux is made very small. For this reason it is advantageous to apply the invention to transmitters as well as to receivers in a remote control system.

Figure 2:
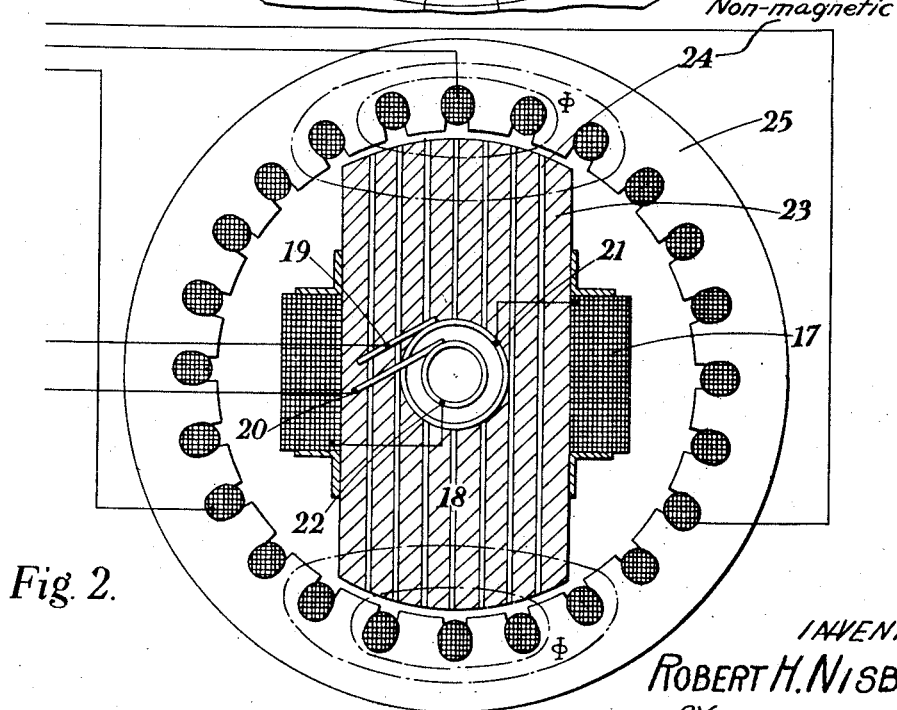

In order that the invention may be clearly understood and readily carried into effect, the same will now be described more fully with reference to the accompanying drawing in which Figure 1 represents diagrammatically one constructional form of self-synchronous receiver with exciting winding on the stator and Figure 2 represents one form of receiver with exciting winding on the rotor.

Referring first to Figure 1 the receiver comprises a rotor 1 built up of laminations of magnetic material provided with slots in which the windings are disposed. The windings are similar to a three phase winding, three connections being taken from electrically equidistant tappings to respective slip rings 2, 3, 4. Currents from a transmitter are fed into the slip rings by suitable brushes 5, 6, 7. The stator surrounding the rotor is made in two sections 8, 9 substantially semi-circular in cross section and built up of laminated magnetic material with inwardly projecting pole pieces formed at their abutting ends. The two sections are separated from each other by strips 10, 11, of non-magnetic material, passing radially down the centre of the pole pieces 12, 13. Round the pole pieces are the coils 14, 15 of the exciting winding. The whole stator is assembled in and fixed to a carcase 16 of non-magnetic material. The closed lines $\phi$ represent the path of the leakage flux which is broken by the gaps between the stator sections 8 and 9. These gaps do not interrupt the path of the main flux down the poles 12 and 13.

The receiver shown in Figure 2 is a self-synchronous repeater the rotor 18 of which is built up of parallel laminations extending parallel to the axis of rotation. This rotor carries an exciting winding 17 disposed to produce flux across the rotor in the planes of the laminations, thereby producing diametrically opposite poles. The winding is connected through brushes 19, 20 resting on the slip rings 21, 22 to the source of exciting current. The laminations are composed alternately of groups of laminations or single laminations of magnetic material 23, and groups of laminations or single laminations of non-magnetic material 24 which may be metal such as aluminium. The stator 25 is built up of laminations of magnetic material whose plane is normal to the axis of the rotor, and which are provided with slots carrying a winding similar to a polyphase winding. In the present case a three phase winding is used, the three lines from the transmitter feeding it with the currents required to produce alignment of the rotor with the transmitter. In this construction the closed lines $\phi$ representing the paths of the leakage flux are broken in accordance with the principles of this invention by the gaps formed by the laminations of non-magnetic material. These gaps, however, do not interrupt the path of the main flux across the rotor. The fact that there is a number of such gaps results in a great reduction in the leakage flux and in the distortion produced by it, since paths for leakage flux across a part only of the face of each exciting pole is broken up. A further advantage is that some at least of the non-magnetic laminations may be of a metal such as aluminium and may be proportioned so as to give the optimum damping effect to prevent hunting and similar oscillatory effects.

What I claim is:—

1. A dynamo electric machine for self-synchronous electric transmitting and receiving systems, comprising a rotor member and a stator member, the former of said members having an exciting winding and having strips of aluminum therein, said strips being disposed for interrupting the closed lines of leakage flux between said rotor and stator members.

2. A dynamo electric machine for self-synchronous electric transmitting and receiving systems, comprising a multi-phase wound stator and a rotor, the latter being composed of alternate magnetic and non-magnetic laminations extending parallel to the axis of the machine, and a single-phase wound exciting winding for said rotor.

3. A dynamo-electric machine for self-synchronous electric transmitting and receiving systems, comprising a rotor composed of alternate magnetic and non-magnetic laminations running parallel to the axis of the machine, an exciting winding on said rotor, and a stator built up of laminations of magnetic material whose plane is normal to the axis of the rotor, said stator having a distributed multi-phase winding.

4. A dynamo-electric machine for self-synchronous electric transmitting and receiving systems, comprising a stator and a rotor, the latter being composed of alternate magnetic and aluminum laminations extending parallel to the axis of the machine, and an exciting winding disposed on said rotor to produce flux across the rotor in the planes of the laminations.

ROBERT HAYES NISBET.